US006966786B1

(12) United States Patent
Motojima et al.

(10) Patent No.: US 6,966,786 B1
(45) Date of Patent: Nov. 22, 2005

(54) CARD SOCKET

(75) Inventors: Joe Motojima, Tokyo (JP); Keiichiro Suzuki, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 11/170,599

(22) Filed: Jun. 29, 2005

(30) Foreign Application Priority Data

Jul. 22, 2004 (JP) .............................. 2004-214885

(51) Int. Cl.[7] ......................................... H01R 13/62
(52) U.S. Cl. ..................................................... 439/159
(58) Field of Search ............................... 439/152, 159, 439/160, 630

(56) References Cited

U.S. PATENT DOCUMENTS 5,145,389 A * 9/1992 Okubo ........................ 439/159
5,683,258 A * 11/1997 Takano et al. ............... 439/159
6,162,075 A * 12/2000 Hara et al. ................... 439/159
6,669,494 B2 * 12/2003 Abe ............................. 439/159
6,790,061 B1 * 9/2004 Lai et al. ..................... 439/159

FOREIGN PATENT DOCUMENTS

JP   2000340293   12/2000
JP   2001 371735  12/2001

* cited by examiner

Primary Examiner—Tho D. Ta
Assistant Examiner—James R. Harvey
(74) Attorney, Agent, or Firm—Collard & Roe, P.C.

(57) ABSTRACT

A card socket 100 comprises a slider 40 and a rocker arm 60. The slider 40 is slidable in a card insertion/ejection direction. The rocker arm 60 comprises a fulcrum 61a, a first pressed portion 62 and a second pressed portion 64. The fulcrum 61a is provided between the first pressed portion 62 and the second pressed portion 64. When a first force is provided to the first pressed portion 62, the rocker arm 60 slides toward the slider 40 and prevents the slider 40 from sliding in the card ejection direction. When a second force is provided to the second pressed portion 64, the rocker arm 60 releases the slider 40d. Then, the slider 40 slides in the card ejection direction.

14 Claims, 17 Drawing Sheets

FIG. 5
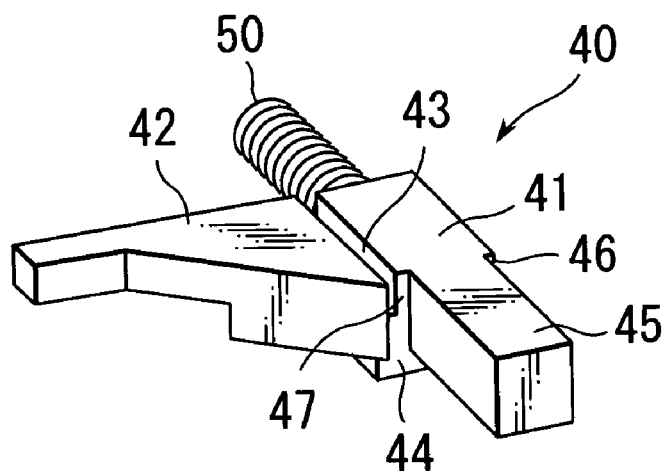
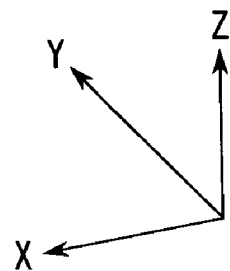
FIG. 6
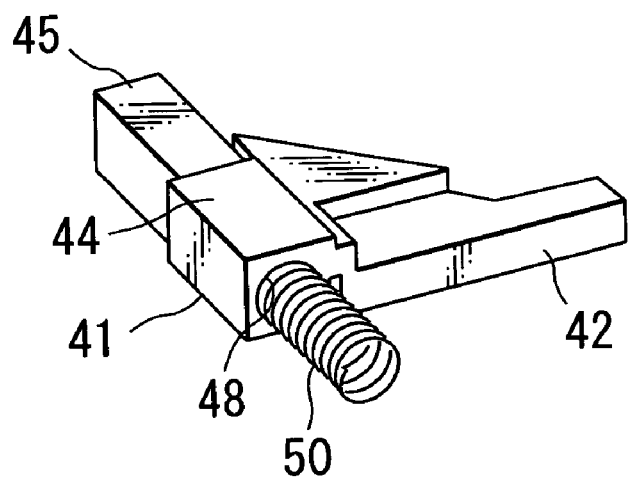
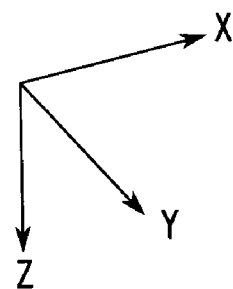

// CARD SOCKET

BACKGROUND OF THE INVENTION

The present invention relates to a card socket which contains a card ejection mechanism. The card socket is also referred to as a card connector.

A small-sized device, such as a cellular phone and a digital camera, comprises a card socket for removably holding a small-sized memory card, which is smaller than a PC card.

For example, a card socket of this type is disclosed in JP-A2001-351735, which is incorporated herein by reference in its entirely. The card socket comprises a card ejection mechanism and an operation member. The card ejection mechanism is activated when the operation member is moved along a thickness direction of the card socket. To block undesirable movement of the card ejection mechanism, the card socket further comprises a specific structure, which is disclosed in JP-A 2001-351735, for example, paragraph 0046. However, there is a problem of lack of the operationality.

SUMMARY OF THE INVENTION

Therefore, it is an object of the present invention to provide a card socket for preventing malfunction of the card ejection mechanism with good operationality.

According to one aspect of the present invention, a card socket comprises a case, a slider, a first urging portion, a rocker arm, a second urging portion and an operation member. The case is holdable a card and allows insertion/ejection of the card thereinto/therefrom. The slider is slidably held in the case and is provided with a transmission portion for mutually transmitting movements of the card and the slider therebetween. The slider is slidable between a first position and a second position. The slider slides with the card toward the first position upon the insertion. While the slider slides with the card toward the second position upon the ejection. The first urging means urges the slider to move toward the second position. The rocker arm is provided with a fulcrum, first and second pressed portions and a stopper, wherein the fulcrum is held in the case in a condition where the rocker arm is rockable between a first rock position and a second rock position. The rocker arm is positioned at the first rock position when the slider is positioned at the first position. The rocker arm is positioned at the second rock position when the slider is positioned at the second position. The fulcrum is positioned between the first and the second pressed portions. The stopper is located between the first pressed portion and the fulcrum. The stopper receives the slider positioned at the first position when the rocker arm is positioned at the first rock position. The second urging means provides a first force for the first pressed portion to urge the rocker arm to move toward the first rock position. The operation member is movably held by the case and is for providing a second force for the second pressed portion to urge the rocker arm to move toward the second rock position against the first force.

An appreciation of the objectives of the present invention and a more complete understanding of its structure may be had by studying the following description of the preferred embodiment and by referring to the accompanying drawings.

BRIEF DESCRIPTION OF THE DRAWINGS

FIG. 5 is a perspective view of the slider of FIG. 1;

FIG. 6 is a perspective view of the slider of FIG. 1, as seen in the opposite direction of FIG. 5;

DESCRIPTION OF PREFERRED EMBODIMENTS

Referring to FIGS. 1 to 23, a card socket according to an embodiment of the present invention is described in detail below.

Figure 1:
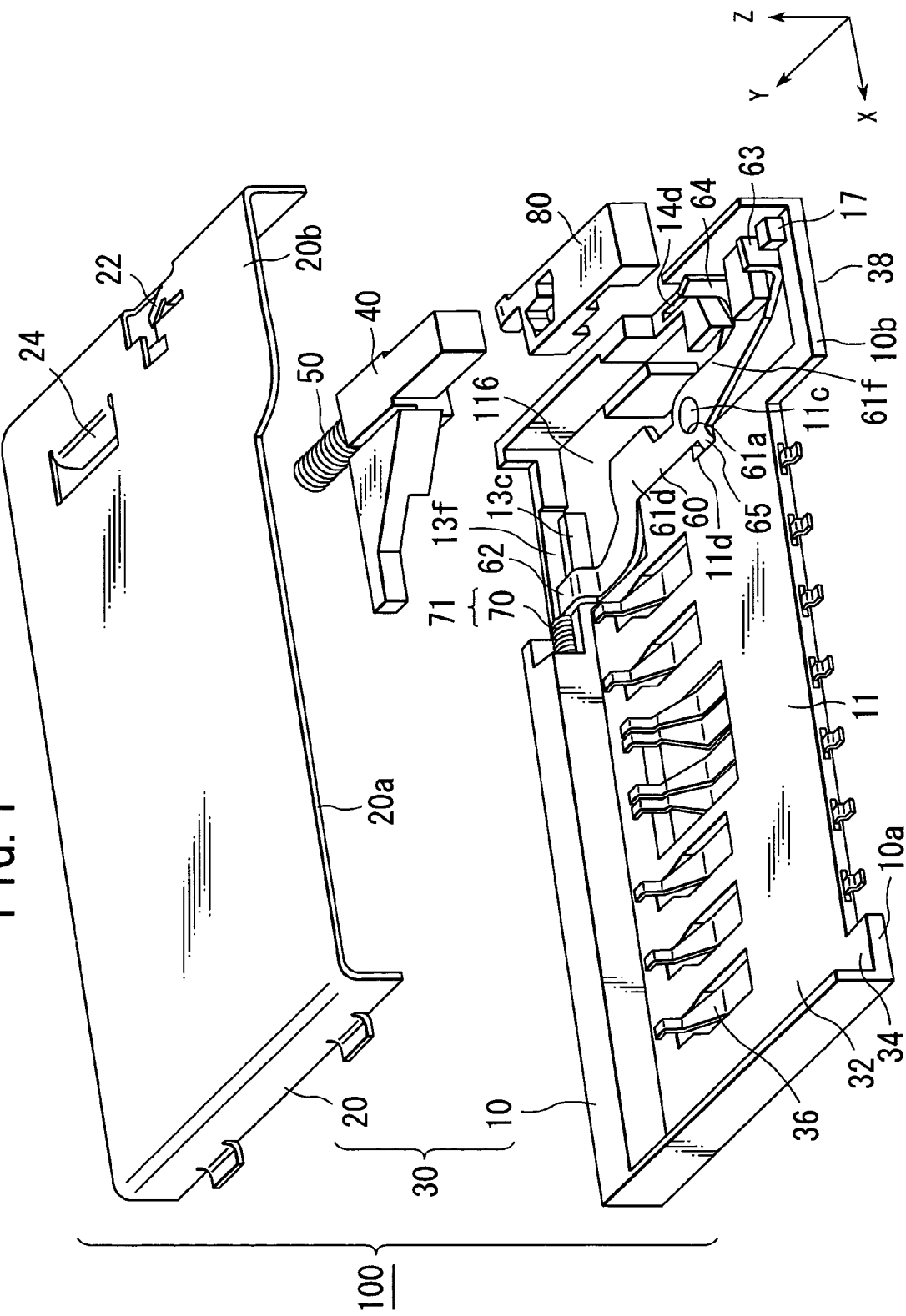
FIG. 1 is an exploded, perspective view showing a card socket of an embodiment of the present invention.

As shown in FIG. 1, the card socket 100 according to the present embodiment of the present invention comprises a case 30, a slider 40, a first compression spring 50, a rocker arm 60, a second compression spring 70 and a button 80.

Figure 15:
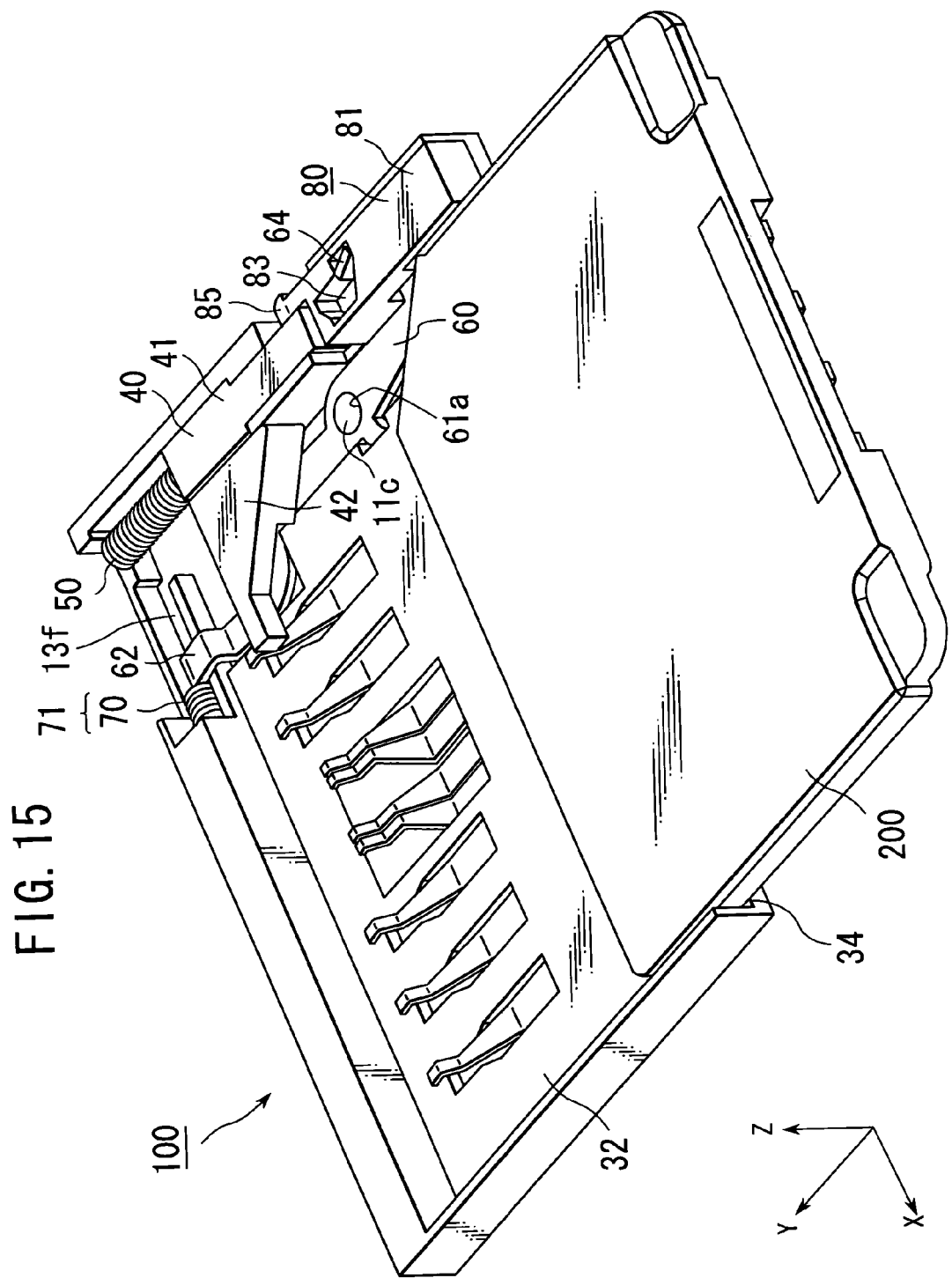
FIG. 15 is a perspective view of the card socket under the initial state of the card insertion process.

The case 30 comprises an insulator 10 and a cover 20. The insulator 10 comprises an edge 10a, a portion 10b, and a bottom portion 11. The edge 10a constitutes a rear end of the insulator 10 in a Y-direction. The portion 10b further projects outwardly of the insulator 10 in comparison with the edge 10a. The cover 20 comprises an edge 20a and a portion 20b. The edge 20a constitutes a rear end of the cover 20 in the Y-direction. The portion 20b further projects outwardly of the cover 20 in comparison with the edge 20a. The bottom portion 11 and the cover 20 define a card housing space 32, which can accommodate a card. The edge 10a and the edge 20a define an open end 34. The open end 34 has a rectangular shape, which is long in an X-direction and is short in a Z-direction. With reference to FIG. 15, the open end 34 allows a card 200 to be inserted into the card housing space 32 and to be ejected from the card housing space 32 along the Y-direction. Turning back to FIG. 1, the insulator 10 holds a plurality of terminals 36, while a free end of the each terminal 36 projects inwardly of the card housing space 32 in the Z-direction so that the each terminal 36 has resilience. The card 200 is pressed on the cover 20 by the terminals 36 when the card 200 is inserted into the card housing space 32.

Figure 2:
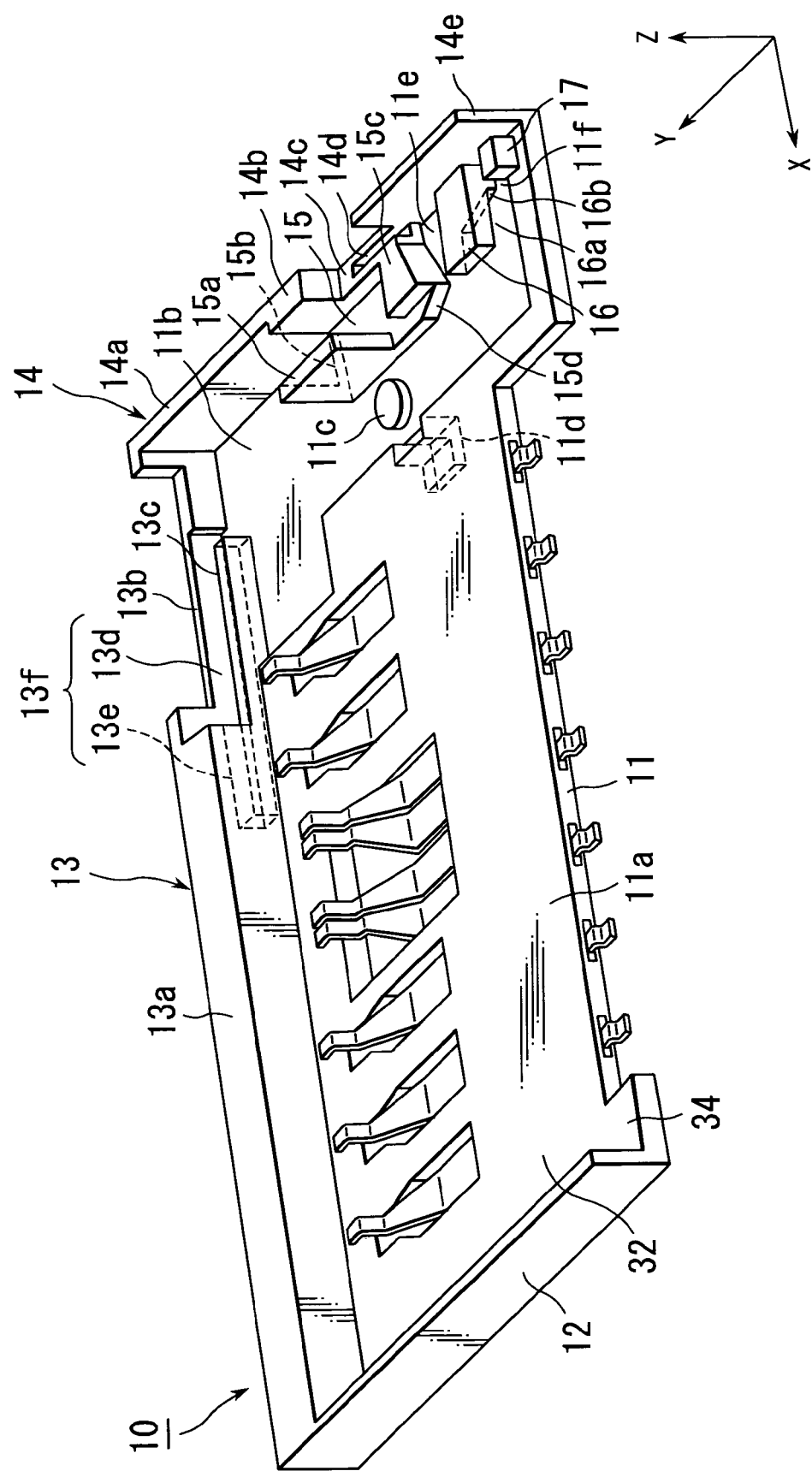
FIG. 2 is a perspective view of the insulator of FIG. 1.

As shown in FIG. 2, the insulator 10 comprises a first wall 12, a second wall 13 and a third wall 14. The first to the third walls 12 to 14 surround three sides of the bottom portion 11. The bottom portion 11 comprises a first bottom portion 11a and a second bottom portion 11b. The first bottom portion 11a constitutes the bottom surface of the card housing space 32. The second bottom portion 11b is concaved by a predetermined depth in comparison with the first bottom portion 11a. In this embodiment, the predetermined depth is equal to the thickness of the rocker arm 60 in the Z-direction. As described later, the second bottom portion 11b rockably accommodates the rocker arm 60. The second bottom portion 11b is formed with a pivot 11c. The pivot 11c is positioned nearly at the center of the second bottom portion 11b in the Y-direction. The pivot 11c projects in the Z-direction and has a short cylindrical shape. The pivot 11c constitutes a fulcrum of rocking movement of the rocker arm 60, as described later. The bottom portion 11 of the insulator 10 is formed with a through hole 11d, which has a staircase-like shape of a single step. The position of the through hole 11d is the border between the first bottom portion 11a and the second bottom portion 11b and around the pivot 11c.

Figure 3:
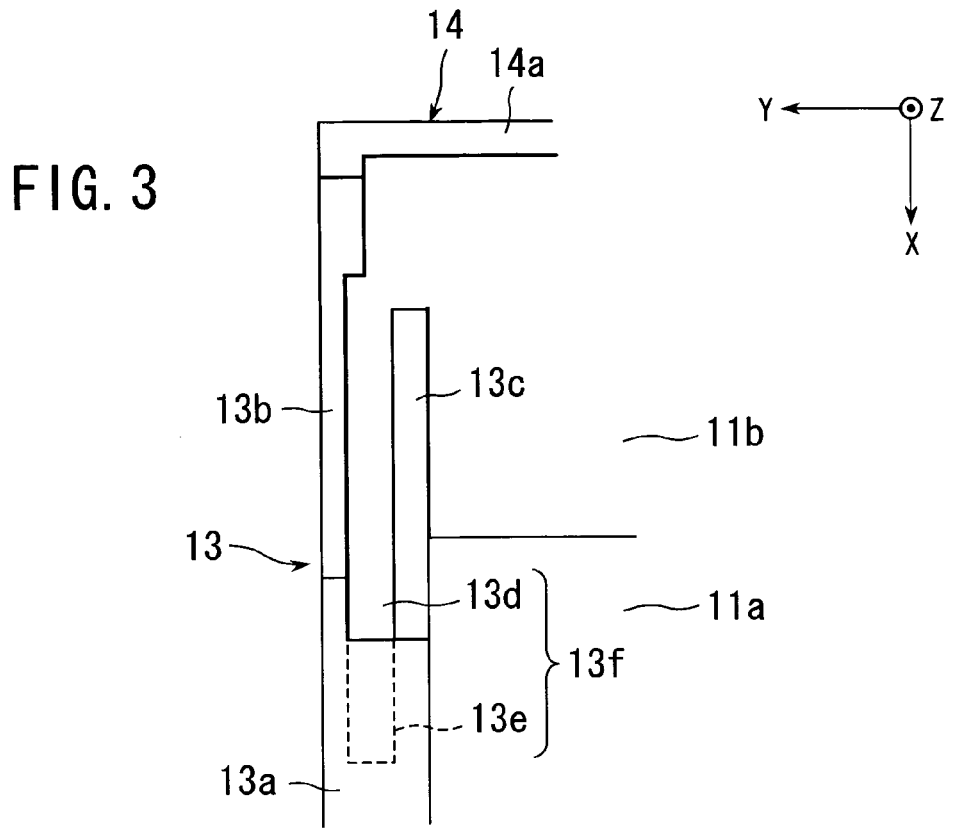
FIG. 3 is a partial, enlarged view of the insulator of FIG. 2.

As apparent from FIGS. 1 to 3, the second wall 13 is placed at the farthest region from the open end 34 in the Y-direction. The second wall 13 comprises a thick wall 13a, a thin wall 13b and a guide rail 13c. The thick wall 13a is thicker than the thin wall 13b. The guide rail 13c is located far from the thin wall 13b by a predetermined distance. The guide rail 13c projects from the second bottom portion 11b in the Z-direction. The thin wall 13b and the guide rail 13c extend from the thick wall 13a along the X-direction. The thin wall 13b and the guide rail 13c define a spring accommodation ditch 13d therebetween. From the spring accommodation ditch 13d, a spring accommodation hole 13e extends into the thick wall 13a along the X-direction. The spring accommodation ditch 13d and the spring accommodation hole 13e form a spring accommodation portion 13f. The spring accommodation portion 13f accommodates the second compression spring 70.

Figure 4:
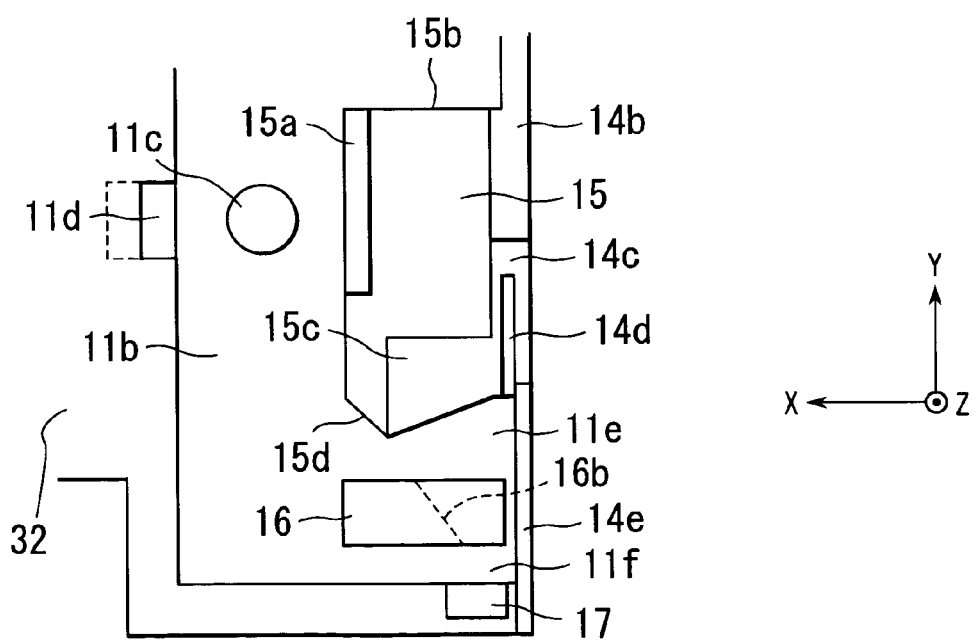
FIG. 4 is a partial, enlarged view of another part of the insulator of FIG. 2.

As shown in FIGS. 2 to 4, the third wall 14 comprises a first portion 14a, a second portion 14b, a third portion 14c, a groove portion 14d, and a fourth portion 14e. The first portion 14a extends from the second wall 13 in the Y-direction. The second portion 14b is thicker than the first portion 14a in the X-direction. The third portion 14c is lower than the second portion 14b in the Z-direction. The groove portion 14d is formed in the third portion 14c and extends in the Y-direction. The depth direction of the groove portion 14d is the Z-direction. The fourth portion 14e extends from the third portion 14c along the Y-direction. As best shown in FIG. 4, an inner surface of the fourth portion 14e and an inner surface of the groove portion 14d are in line with each other, as seen from the Z-direction.

As shown in FIGS. 2 and 4, the second bottom portion 11b is provided with an island portion 15. The pivot 11c is placed between the card housing space 32 and the island portion 15 in the X-direction. The illustrated island portion 15 is placed on the rear half of the insulator 10 in the Y-direction. The island portion 15 has the same height as that of the pivot 11c. The island portion 15 is provided with a standing wall 15a, an edge portion 15b, a plateau portion 15c and a portion 15d. The standing wall 15a is placed at the nearest position to the pivot 11c on the island portion 15 and extends along the Y-direction. As described later, the standing wall 15a and the second portion 14b form a guide portion for receiving a rear portion of the slider 40. The edge portion 15b constitutes the front end of the island portion 15 and defines an end position of the slider 40. The plateau portion 15c is placed on an end portion of the island portion 15 in the Y-direction and protrudes in the Z-direction. The plateau portion 15c has the same height as that of the third portion 14c of the third wall 14. The portion 15d constitutes a side surface of the island portion 15, which is positioned near the plateau portion 15c. The portion 15d is perpendicular to the X-Y plane and extends diagonally across the X- and the Y-directions.

As also shown in FIGS. 2 and 4, the insulator 10 is further provided with a first projection portion 16. The first projection portion 16 is formed on the second bottom portion 11b and is positioned away from the island portion 15 in the Y-direction. The first projection portion 16 has an L-shaped cross-section in the X-Z plane. The first projection portion 16 projects from the second bottom portion 11b in the Z-direction and then projects in the X-direction. The first projection portion 16 and the second bottom portion 11b form a gap 16a therebetween. The gap 16a accommodates a part of the rocker arm 60, as described later. The gap 16a described in this embodiment is slightly larger than the thickness of the rocker arm 60. The first projection portion 16 is provided with a portion 16b. The portion 16b is perpendicular to the second bottom portion 11b and faces the gap 16a. As shown in FIG. 4, the portion 16b and the portion 15d are substantially in line with each other.

As best shown in FIG. 4, the first projection portion 16 is positioned with a predetermined distance left between the fourth portion 14e of the third wall 14 and the first projection portion 16. The predetermined distance is the same as the width of the groove portion 14d in the X-direction. The first projection portion 16 and the island portion 15 define a first region 11e therebetween. The role of the first region 11e will be described with the rocker arm 60.

As shown in FIGS. 2 and 4, the insulator 10 further comprises a second projection portion 17. The second projection portion 17 is placed away from the first projection portion 16 in the Y-direction. The first projection portion 16 is placed between the island portion 15 and the second projection portion 17. The second projection portion 17 projects from the bottom portion 11 in the Z-direction. The second projection portion 17 is placed with the predetermined distance left between the fourth portion 14e of the third wall 14 and the second projection portion 17. The second projection portion 17 and the first projection portion 16d define a second region 11f therebetween. The role of the second region 11f will be described with the rocker arm 60. As shown in FIG. 1, the second projection potion 17 is positioned on the portion 10b. The portion 10b and the portion 20b form an overhanging portion 38. The overhanging portion 38 sticks out from the open end 34 in the Y-direction. The function of the overhanging portion 38 will be described with a press operation of the button 80.

As shown in FIG. 1, the cover 20 comprises a cantilever spring 22 and a guide plate 24. The cantilever spring 22 is arranged to face the groove portion 14d of the insulator 10. The cantilever spring 22 extends inwardly of the case 30 and in the direction of the insertion of the card. The cantilever spring 22 urges the button 80 to project from the case 30 in the Y-direction. The guide plate 24 is flat and extends from the cover 20 inwardly of the case 30 in the Z-direction and also extends in the Y-direction. The guide plate 24 is obtainable by making an angular U-shaped cut into the main surface of the cover 20 to form a plate portion, followed by bending the plate portion inwardly of the case 30.

As shown in FIGS. 5 and 6, the slider 40 comprises a main portion 41 and a transmission portion 42. The main portion 41 has a rectangular parallelepiped shape which is long in the Y-direction. The transmission portion 42 projects from the main portion 41 in the X-direction. The slider 40 is provided with a guided slit portion 43, which is formed between the main portion 41 and the transmission portion 42. The guided slit portion 43 receives the guide plate 24 of the cover 20. From the bottom of the main portion 41, a projection portion 44 projects in the Z-direction. The projection portion 44 has a rectangular cross-section in the X-Y plane. The projection portion 44 is slidable on the second bottom portion 11$b$. In this embodiment, a projection amount of the projection portion 44 is as much as the thickness of the rocker arm 60.

The main portion 41 of the slider 40 is provided with a guided portion 45, which constitutes the rear end portion of the main portion 41. In the main portion 41, the guided portion 45 is narrower than the other part. The guided portion 45 has shoulder portions 46 and 47. The guided portion 45 is accommodated in the guide portion defined by the standing wall 15$a$ of the island portion 15 and the second portion 14$b$ of the third wall 14. The guide portion, the guide plate 24 of the cover 20 and the guided slit portion 43 of the slider 40 prevents the slider 40 from moving in the X-direction even if the slider 40 receives a force in the X-direction.

When the shoulders 46 and 47 of the slider 40 are brought into contact with the standing wall 15$a$ and the second portion 14$b$, the projection portion 44 of the slider 40 is brought into contact with the edge portion 15$b$ of the island portion 15 and is prevented from further sliding. In this embodiment, a position of the slider 40 is referred to as a first position, at which the slider 40 is positioned when the card 200 is completely inserted into the case 30. Another position of the slider 40 is referred to as a second position, at which the slider 40 is prevented from sliding backward in the Y-direction by the island portion 15 and so on.

As shown in FIG. 6, the slider 40 is provided with a hole 48. The hole 48 is formed in the main portion 41 and extends in the Y-direction. The hole 48 receives the first compression spring 50 therein. The first compression spring 50 is mounted on the insulator 10 together with the slider 40 and urges the slider 40 to move toward the second position.

Figure 18:
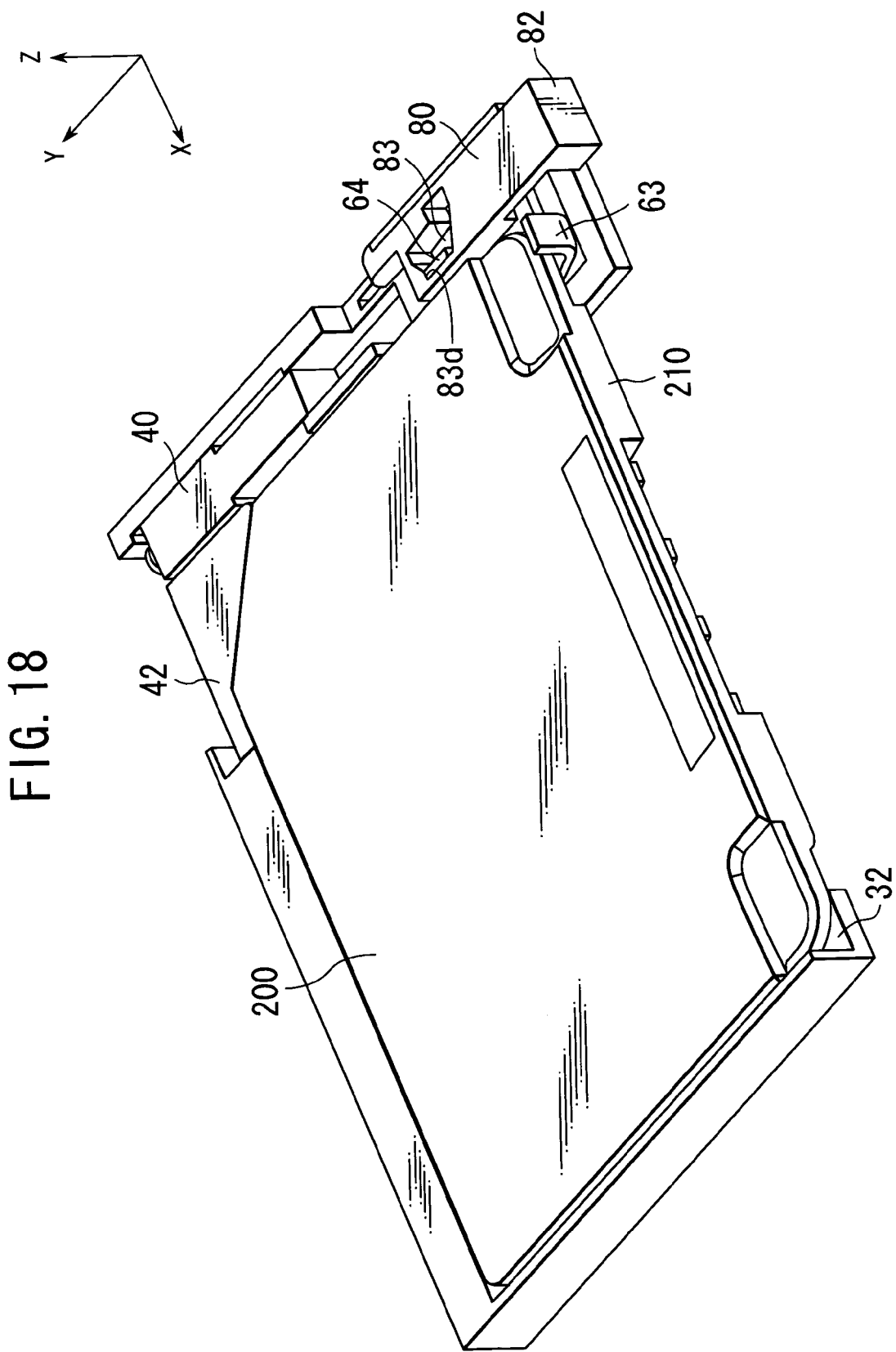
FIG. 18 is a perspective view of the card socket in a state where the card is completely inserted into the card socket.
Figure 20:
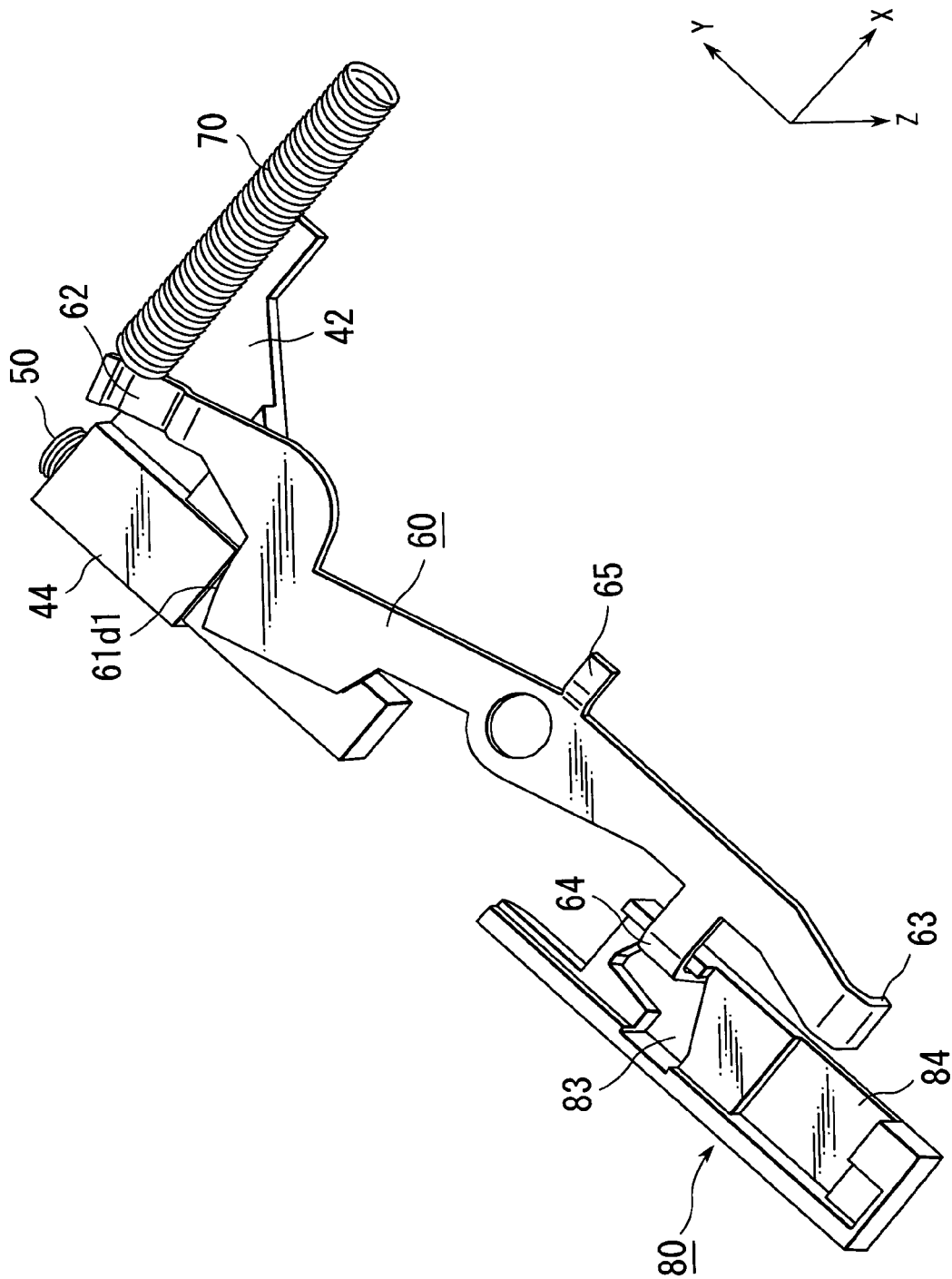
FIG. 20 is a bottom view of some components of the card socket in the state shown in FIG. 18.

In this embodiment, the transmission portion 42 of the slider 40 is placed above the spring accommodation portion 13$f$ of the insulator 10 in the Z-direction, as understood from FIGS. 18 and 20, when the card 200 is inserted into the case 30 and the slider 40 is positioned at the first position. In this event, the transmission portion 42 is not in contact with the guide rail 13$c$ and the second compression spring 70. Thus, the projection area of the card socket 100 is downsized.

Figure 7:
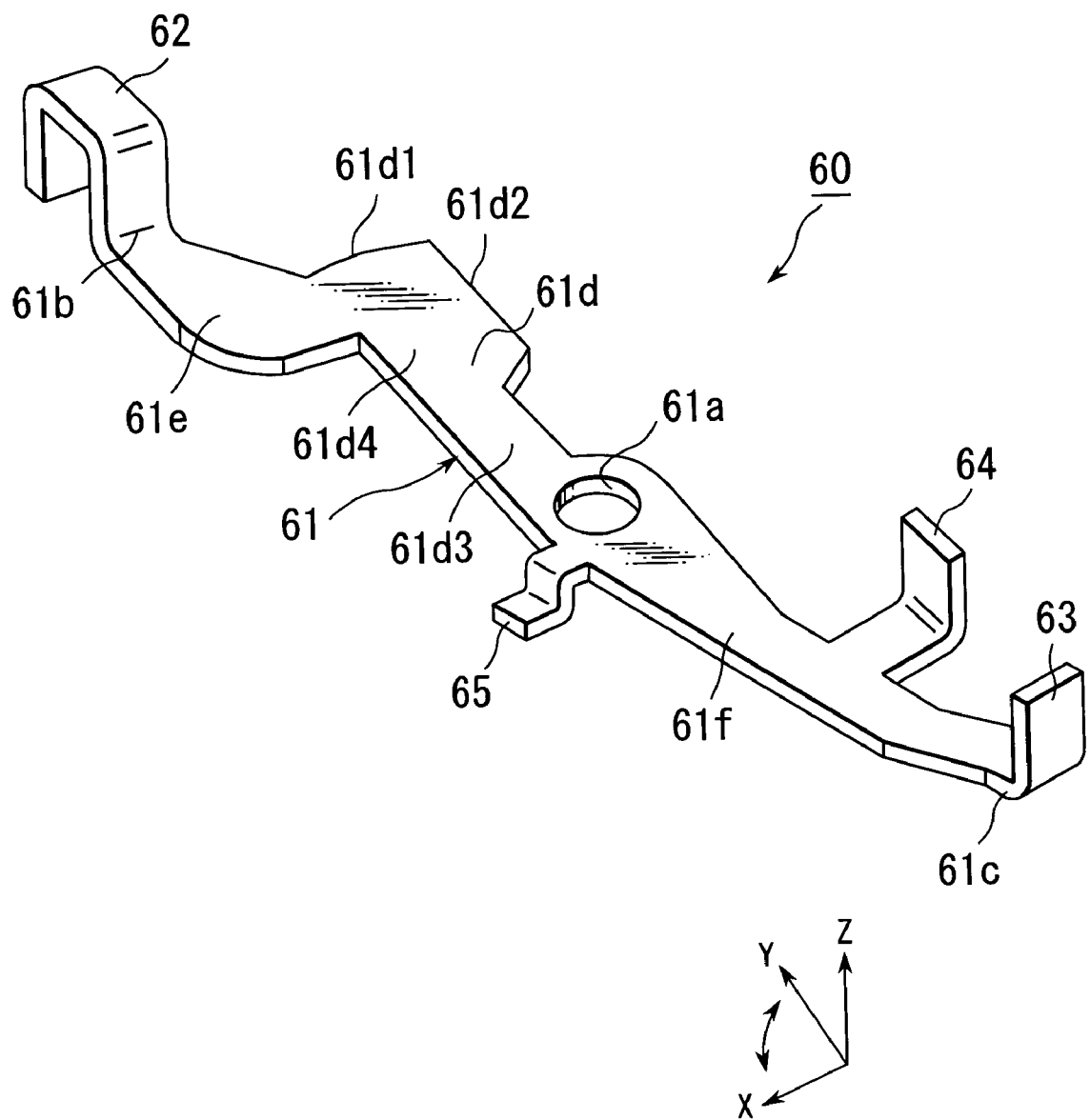
FIG. 7 is a perspective view of the rocker arm of FIG. 1.

As shown in FIG. 7 the rocker arm 60 comprises a main plate 61. The main plate 61 comprises a first end portion 61$b$ and a second end portion 61$c$. The main plate 61 is formed with a pivot opening 61$a$, which is positioned between the first end portion 61$b$ and the second end portion 61$c$. The first end portion 61$a$ is formed with a first pressed portion 62, which has a U-shaped cross-section. The bottom of the U-shape of the first pressed portion 62 projects upwards in the Z-direction. The second end portion 61$c$ of the main plate 61 is formed with a posterior edge receiving portion 63. The posterior edge receiving portion 63 projects from the second end portion 61$c$ in the Z-direction. As shown in FIG. 18, when the card 200 of a predetermined size is inserted into the card housing space 32, the posterior edge receiving portion 63 receives the posterior edge of the card 200 and prevents the card 200 from falling out of the card housing space 32. Turning back to FIG. 7, the rocker arm 60 is further provided with a second pressed portion 64, which is positioned between the pivot opening 61$a$ and the second end portion 61$c$ and projects in the Z-direction.

In detail, the main plate 61 comprises a first plate portion 61$d$, a second plate portion 61$e$ and a third plate portion 61$f$. The first plate portion 61$d$ comprises a narrow plate portion 61$d$3 and a wide plate portion 61$d$4. The narrow plate portion 61$d$3 is placed between the pivot opening 61$a$ and the wide plate portion 61$d$4. The wide plate portion 61$d$4 is placed between the narrow plate portion 61$d$3 and the second plate portion 61$e$. The second plate portion 61$e$ has an L-like shape. The front edge of the first plate portion 61$d$ is slightly carved. As described later, the front edge of the first plate portion 61$d$ receives the projection portion 44 of the slider 40 in the Y-direction when the slider 40 is positioned at the first position. Thus, the front edge of the first plate portion 61$d$ serves as a stopper 61$d$1 which prevents the slider 40 from sliding toward the second position. The third plate portion 61$f$ extends from the first plate portion 61$d$ with the pivot opening 61$a$ positioned therebetween. In this embodiment, the first plate portion 61$d$ and the third plate portion 61$f$ are not arranged on a straight line. The first plate portion 61$d$ and the second plate portion 61$e$ form a dogleg shape. The main plate 61 comprises a restriction portion 65. The restriction portion 65 is placed near the pivot opening 61$a$ and projects in the Z-direction. In detail, the restriction portion 65 projects opposite to the projecting direction of the first and the second pressed portions 62 and 64 and the posterior edge receiving portion 63.

Figure 19:
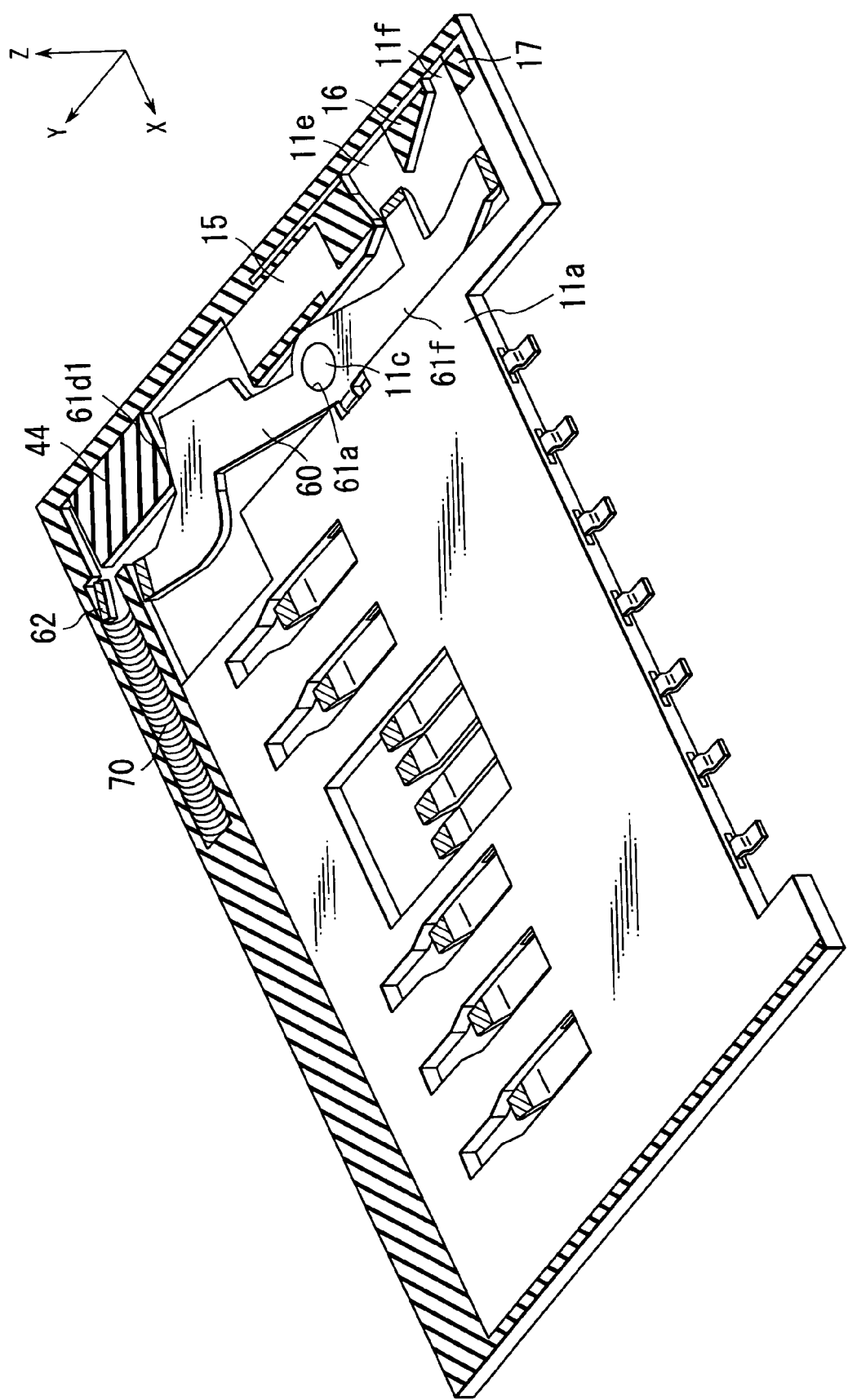
FIG. 19 is a partially cross-sectional view which is associated with the state shown in FIG. 18.

As shown in FIG. 1, the pivot 11$c$ is rotatably fitted into the pivot opening 61$a$ so that the rocker arm 60 is held on the second bottom portion 11$b$ of the insulator 10. The restriction portion 65 is accommodated in the through hole 11$d$ of the insulator 10. The restriction portion 65 restricts the rocking movement of the rocker arm 60 and allows the main plate 61 to rock in a plane parallel to the second bottom portion 11$b$ of the insulator 10, i.e., the X-Y plane. The rockable range of the rocker arm 60 is defined by and the first plate portion 61$d$ and the third plate portion 61$f$ the step height between the first bottom portion 11$a$ and the second bottom portion 1$b$. In this embodiment, when the third plate portion 61$f$ of the rocker arm 60 is brought into contact with the first bottom portion 11$a$ in the X-direction as shown in FIG. 19, the rocker arm 60 is placed at a first rock position. When the first plate portion 61$d$ of the rocker arm 60 is brought into contact with the first bottom portion 11$a$ in the X-direction, as shown in FIG. 16, the rocker arm 60 is placed at a second rock position.

With reference to FIGS. 1 and 15, the first pressed portion 62 of the rocker arm 60 is arranged to straddle the guide rail 13$c$ of the insulator 10 to be brought into contact with the second compression spring 70 in the X-direction. The first pressed portion 62 receives a force from the second compression spring 70 to move toward the slider 40. The second compression spring 70 constitutes, in cooperation with the spring accommodation portion 13$f$, a second urging portion 71 and urges the rocker arm 60 to move toward the first rock position. As apparent from FIGS. 1, 2 and 4, the second pressed portion 64 is movable in the first region 11e, and the posterior edge receiving portion 63 is movable in the second region 11f. Because the first region 11e, the second region 11f and the gap 16a is provided for the insulator 10, the second pressed portion 64 and the posterior edge receiving portion 63 can move smoothly during the rock movement of the rocker arm 60 between the first rock position and the second rock position.

Figure 16:
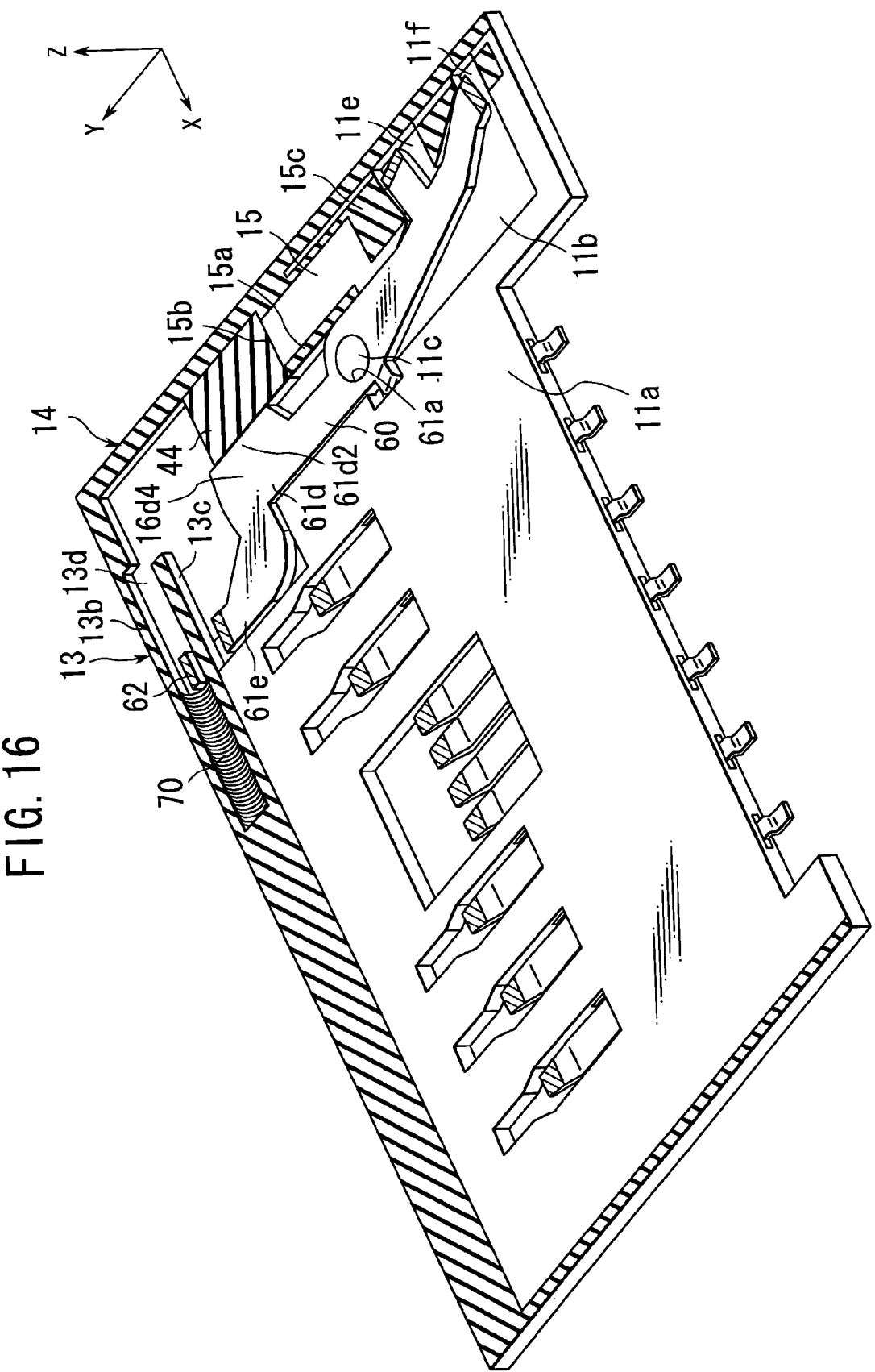
FIG. 16 is a parcially cross-sectional view which is associated with the state shown in FIG. 15.

As shown in FIG. 16, in the state where the rocker arm 60 is positioned at the second rock position, the first plate portion 61d of the rocker arm 60 extends toward the second wall 13 along the Y-direction. In this state, the edge portion 61d2 of the wide plate portion 61d4 projects toward the third wall 14. The second plate portion 61e extends from the end portion of the first plate portion 61d in the X-direction away from the slider 40 and then extends toward the second wall 13 in the Y-direction.

As shown in FIG. 19, in the state where the rocker arm 60 is positioned at the first rock position, the third plate portion 61f extends toward the open end 34 along the Y-direction.

Figure 14:
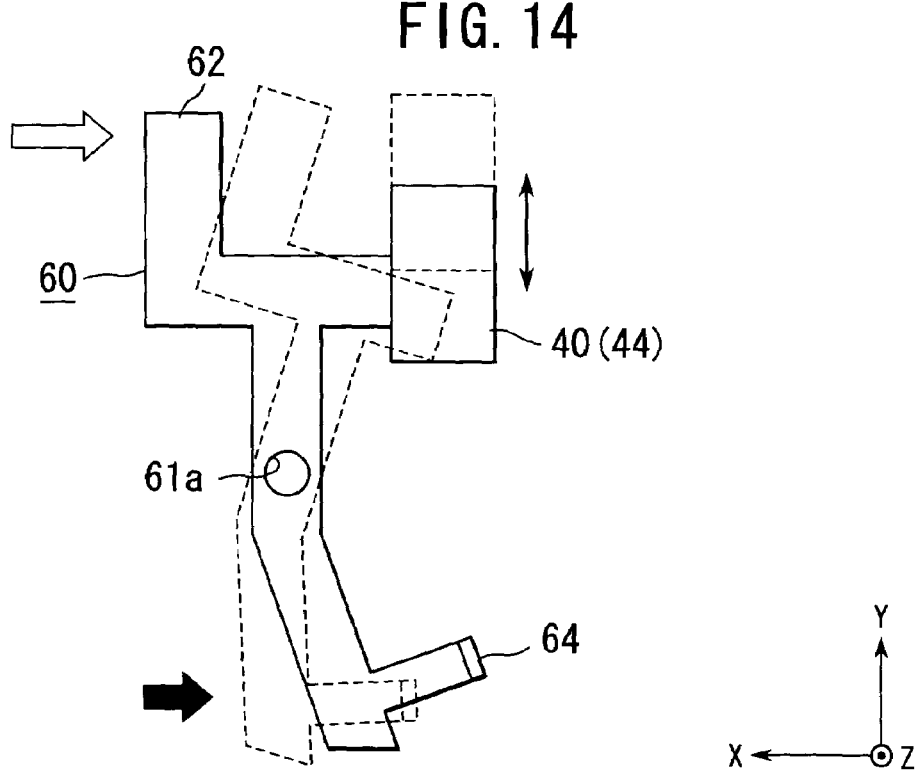
FIG. 14 is a schematic view of relationship between the slider and the rocker arm in the card socket.

Under the positional relation described above, the rocker arm 60 and the slider 40 move as shown in FIG. 14. In FIG. 14, the slider 40 at the first position is shown by the dashed line. The slider 40 at the second position is shown by the solid line. The rocker arm 60 at the first rock position is shown by the dashed line. The rocker arm 60 at the second rock position is shown by the solid line.

As shown in FIG. 14, the rocker arm 60 receives from the second compression spring 70a a force which is shown by the outlined arrow, wherein the force is hereinafter referred to as a first force. When the slider 40 is placed at the second position, the rocker arm 60 is prevented from rocking toward the first rock position by the projection portion 44 of the slider 40. When the slider 40 slides to the first position upon the insertion of the card, the rocker arm 60 is allowed to rock toward the first rock position from the second rock position. The rocker arm 60 at the first rock position prevents the slider 40 from sliding to the second position. In this state, when a force shown by the black arrow is applied to the second pressed portion 64, the rocker arm 60 is moved toward the second rock position, wherein the force of the black arrow is hereinafter referred to as a second force. Then, nothing blocks the movements of the slider 40 so that the slider 40 slides to the second position in accordance with the first compression spring 50. The movement of the slider 40 in the Y-direction is transmitted to the card by means of the transmission portion 42 so that the card is ejected from the card socket 100.

In the above-mentioned movement, the button 80 serves as a portion for providing the second force to the second pressed portion 64 of the rocker arm 60. As shown in FIGS. 8 to 13, the button 80 comprises a main portion 81 and a pressed portion 82. The main portion 81 is a rectangular plate. The pressed portion 82 is formed at the rear end of the main position 81. As shown in FIG. 18, the pressed portion 82 projects out from the case 30 along the Y-direction, when the card is completely inserted into the case 30. The projecting direction of the pressed portion 82 is referred to as a card ejection direction. The pressed portion 82 is pressed by a user for ejecting the inserted card from the case 30 in the card ejection direction.

Figure 22:
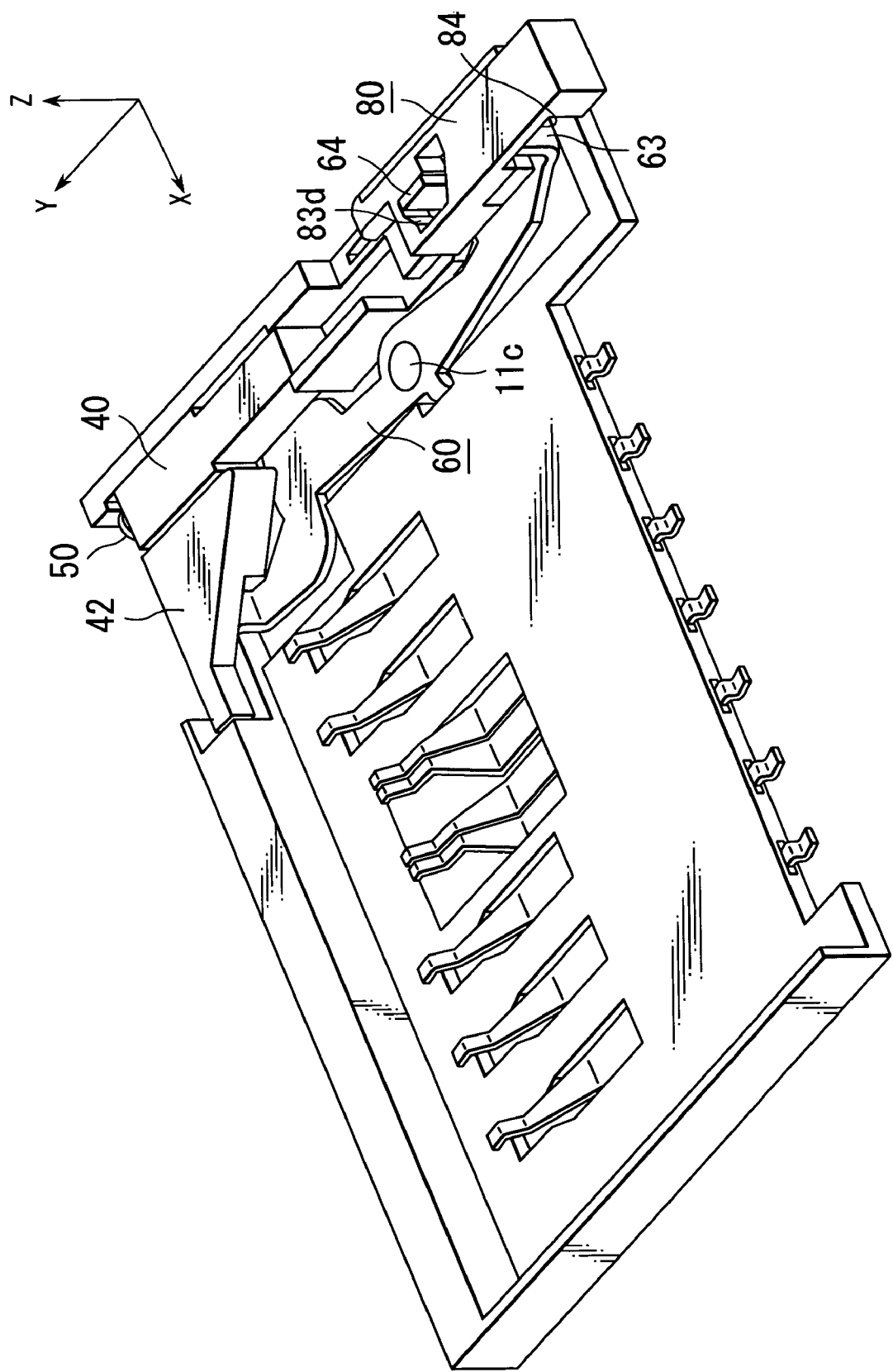
FIG. 22 is a perspective view of the card socket, which is in a state associated with a long card.

As shown in FIGS. 15, 18 and 22, the button 80, especially the main portion 81, and the main portion 41 of the slider 40 are arranged on an imaginal straight line in the Y-direction. As apparent from FIG. 15 or 18, the imaginal straight line is laid on the outside region of the card housing space 32 in the X-direction so that the card 200 is not in contact with the button 80 and the main portion 41 of the slider 40 upon the insertion or the ejection of the card 200. As apparent from FIG. 16 or 19, the pivot opening 61a of the rocker arm 60 and the pivot 11c of the insulator 10 are placed away from the imaginal straight line in the X-direction. Especially, in this embodiment, the pivot opening 61a of the rocker arm 60 and the pivot 11c of the insulator 10 are placed inwardly of the case 30 in the X-direction, as seen from the imaginal straight line.

Figure 10:
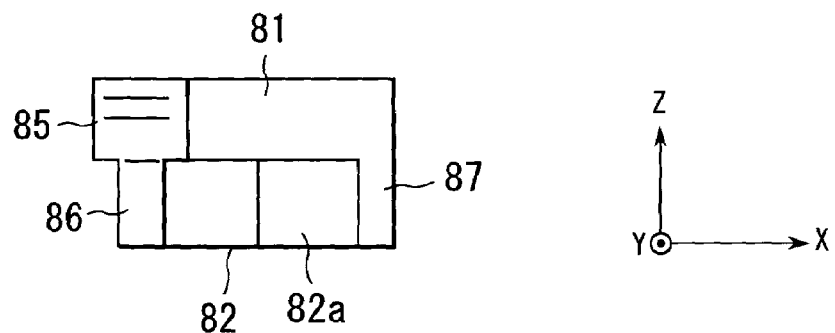
FIG. 10 is a front view of the button shown in FIG. 8.
Figure 11:
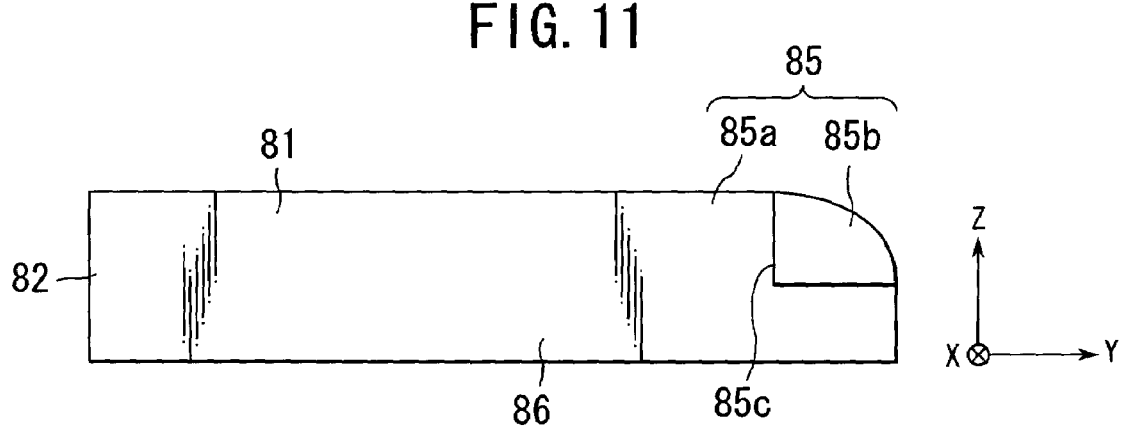
FIG. 11 is a side view of the button shown in FIG. 8.
Figure 12:
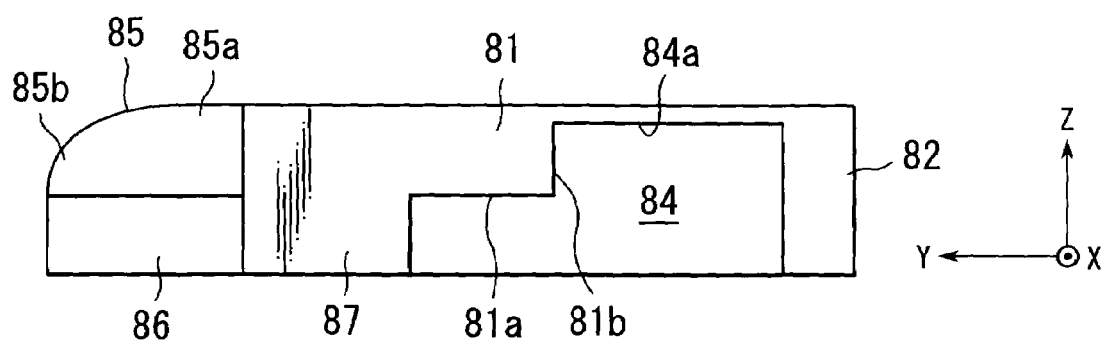
FIG. 12 is the other side view of the button shown in FIG. 8.

With reference to FIGS. 8 to 13, the main portion 81 of the button 80 is formed with an accommodation portion 83. The accommodation portion 83 accommodates the second pressed portion 64 of the rocker arm 60. In this embodiment, the accommodation portion 83 is a through-hole in the Z-direction. The button 80 is further formed with a space 84, which is positioned between the accommodation portion 83 and the pressed portion 82, as shown in FIG. 12. The space 84 accommodates the posterior edge receiving portion 63 of the rocker arm 60 when the rocker arm 60 is positioned at the second rock position. The lower surface 81a of the main portion 81 is lower than the upper surface 84a of the space 84 in the Z-direction. The lower surface 81a of the main portion 81 and the upper surface of the plateau portion 15c are placed on the same level in the Z-direction when the button 80 is mounted on the insulator 10. The upper surface 84a of the space 84 and the upper surface of the first projection portion 16 are placed on the same level in the Z-direction when the button 80 is mounted on the insulator 10.

The pressed portion 82 is formed with a projection-accommodation portion 82a. The projection-accommodation portion 82a accommodates the second projection portion 17 of the insulator 10 when the button 80 is pressed into the case 30 in the Y-direction. When the projection-accommodation portion 82a accommodates the second projection portion 17, the button 80 is prevented from being further pressed into the case 30 in the Y-direction. Thus, the second projection portion 17 prevents the forward movement of the button 80 over the second projection portion 17 in the Y-direction.

Figure 8:
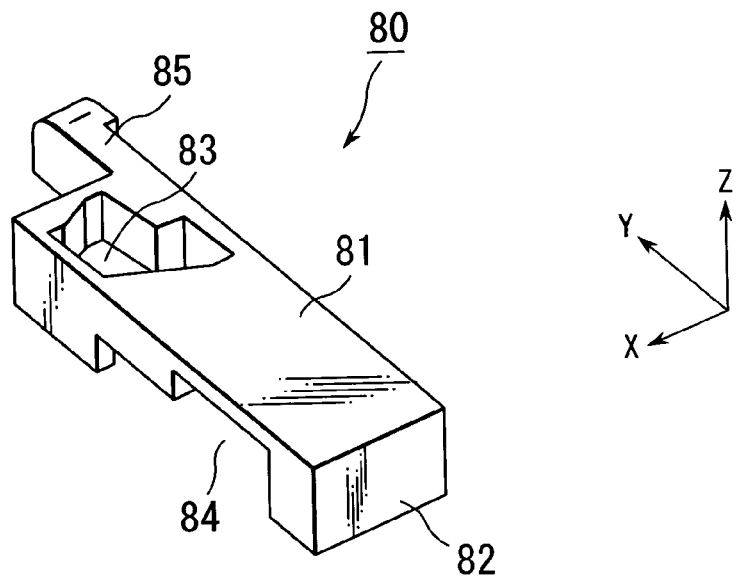
FIG. 8 is a perspective view of the button of FIG. 1.
Figure 9:
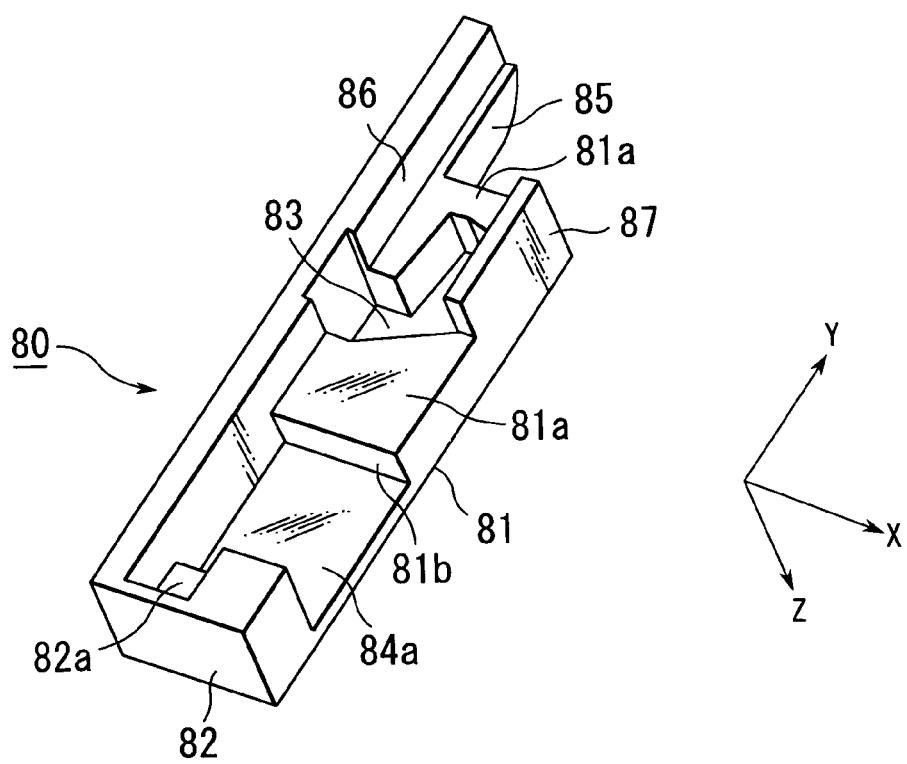
FIG. 9 is a perspective view of the button of FIG. 1, as seen in a direction different from that of FIG. 8.

From the front end of the main portion 81 of the button 80, a projection head 85 projects in the Y-direction, as shown in FIGS. 8 and 9. As shown in FIGS. 11 and 12, the projection head 85 comprises a first portion 85a and a second portion 85b. The first portion 85a has a rectangle-like shape and projects from the main portion 81 in the Y-direction. The second portion 85b further projects from the first portion 85a forward in the Y-direction. The second portion 85b has a curved surface, which extends in the Y-direction and curves downwards in the Z-direction. When the button 80 is mounted on the card socket 100, the cantilever spring 22 presses the second portion 85b backward in the Y-direction. That is, the cantilever spring 22 formed in the cover 20 urges the button 80 to project outwardly of the case 30. As most clearly shown in FIG. 13, the second portion 85b projects outwardly in the X-direction in comparison with the first portion 85a. On the border between the first portion 85a and the second portion 85b, a shoulder portion 85c is formed. When the button 80 is moved backward in the Y-direction, the fourth portion 14e receives the shoulder portion 85c and stops the further movement of the button 80. Thus, the shoulder portion 85c and the fourth portion 14e define an amount of the projection of the button 80 from the case 30.

As shown in FIGS. 9 to 12, the button 80 is provided with a guided rail 86. The guided rail 86 extends downwardly from the outer edge of the main portion 81 and the projection head 85 in the Z-direction. The guided rail 86 is inserted in the groove portion 14d so that the guided rail 86 is slidable in the Y-direction. The button 80 is held on the insulator 10 to be slidable in the Y-direction. Between the first projection portion 16 and the fourth portion 14e and between the second projection portion 17 and the fourth portion 14e, there are the gaps, each of which has the same width as the groove portion 14d. The guided rail 86 is prevented from moving in the X-direction by the first projection portion 16, the second projection portion 17 and the fourth portion 14e of the third wall 14 so that the button 80 can move properly along the Y-direction.

With reference to FIGS. 9, 10 and 12, the main portion 81 is provided with a wall 87. The wall 87 extends from the inner edge of the main portion 81 in the Z-direction and is opposite to the guided rail 86 in the X-direction. When the groove portion 14d guides the guided rail 86 so that the button 80 slides in the X-direction, the wall 87 slides on the upper surface of the island portion 15 and on the side surface of the plateau portion 15c. Because the button 80 is formed so that the upper surface 84a of the space 84 is slidable on the upper surface of the first projection portion 16, the movement of the button 80 in the Z-direction is properly regulated.

Figure 13:
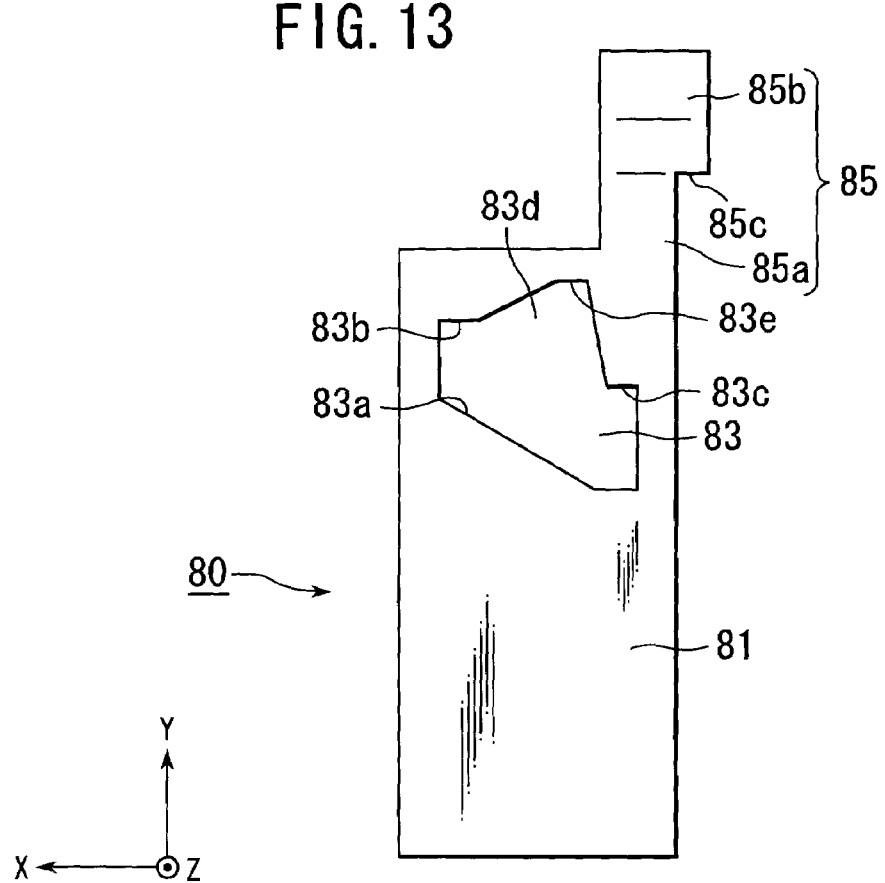
FIG. 13 is a plan view of the button shown in FIG. 8.

As most clearly shown in FIG. 13, the backward surface in the Y-direction of the accommodation portion 83 constitutes a cam surface 83a. The cam surface 83a is formed perpendicular to the X-Y plane and across the X-Z plane as well as the Y-Z plane. The accommodation portion 83 is further formed with a first receiving portion 83b and a second receiving portion 83c, which correspond to the opposite ends in the Y-direction of the cam surface 83a and are faced to the cam surface 83a in the X-direction. The first receiving portion 83b receives the second pressed portion 64 in the Y-direction when the rocker arm 60 is positioned at the first rock position. The second receiving portion 83c receives the second pressed portion 64 in the Y-direction when the rocker arm 60 is positioned at the second rock position. In this embodiment, the button 80 is further provided with a pocket 83d. The pocket 83d is necessary when a long card longer than the predetermined length is used. The operations in the state where the long card is inserted into the card socket 100 will be described later.

Here, a supplemental description of the operations or the movements of the button are made. In the state of the complete insertion of a card, the button 80 is pressed by the cantilever spring 22 toward the card election direction to project outwardly of the case 30. When the button 80 is pressed inwardly of the card 30 or toward the second wall 13 along the Y-direction against the elastic force of the cantilever spring 22, the second pressed portion 64 is apart from the first receiving portion 83b and is brought into contact with the cam surface 83a. When the button 80 is further pressed along the card insertion direction, the second pressed portion 64 is guided by the cam surface 83a and is moved outwards in the X-direction. In other words, the cam surface 83a converts the insertion force toward the Y-direction into the second force toward the X-direction and transmits the second force to the second press portion 64. By the function of the cam surface 83a, the rocker arm 60 moves from the first rock position toward the second rock position upon the card ejection. When the button 80 is released upon the card ejection, the button 80 is slightly slid by the cantilever spring 22 toward the card ejection direction so that the second pressed portion 64 is received by the second receiving portion 83c.

Next explanation will be made about the whole operations of the card socket 100 with reference to FIGS. 14 to 20.

Figure 17:
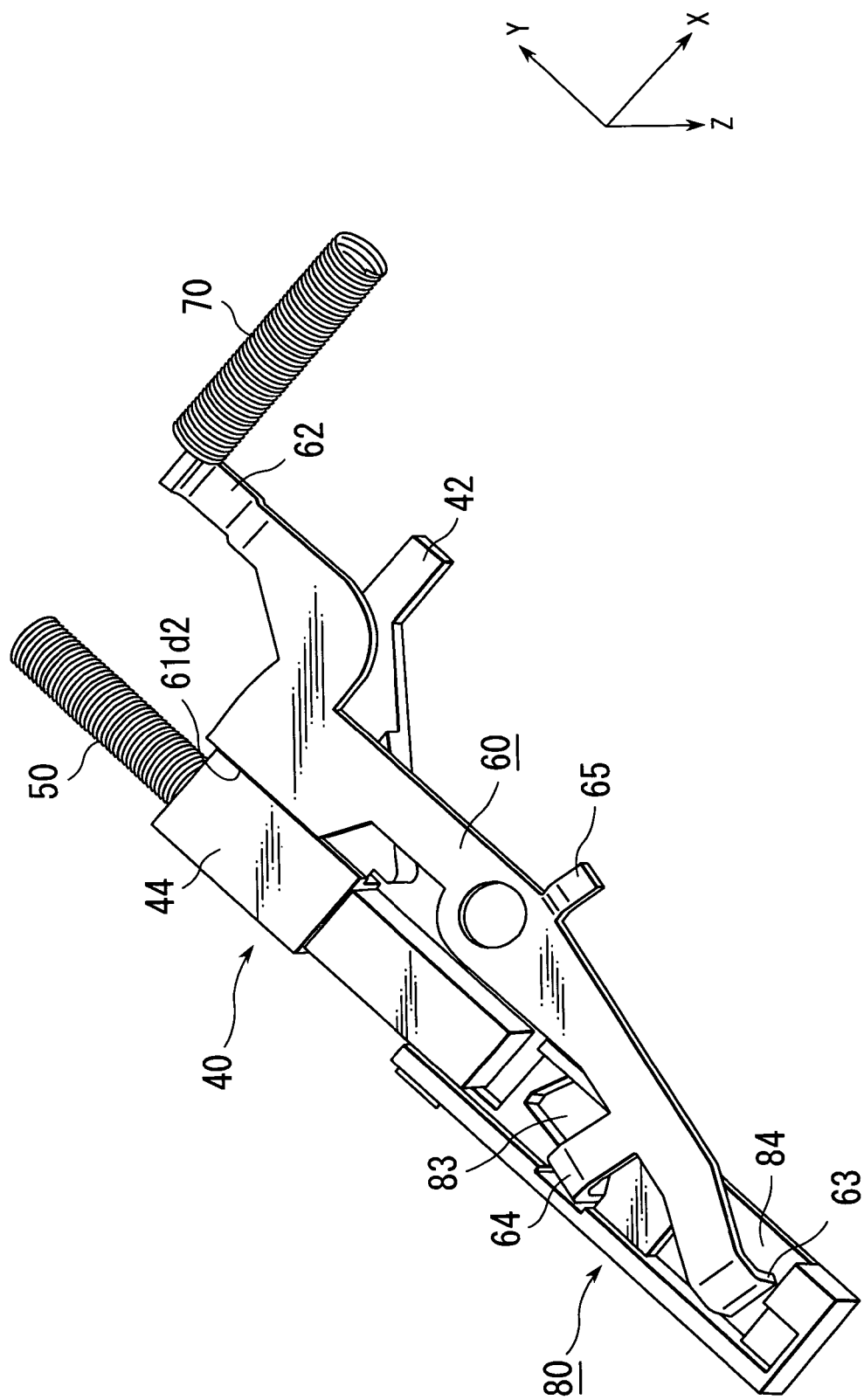
FIG. 17 is a bottom view of some components of the card socket in the state shown in FIG. 15.

As shown in FIGS. 15 to 17, prior to the insertion of the card 200, the slider 40 is positioned at the second position and is pressed by the first compression spring 50 toward the card ejection direction. In this state, the projection portion 44 receives the edge portion 61d2 in the X-direction so that the rocker arm 60 is prevented from rocking toward the first rock position even if the rocker arm 60 receives the first force from the second compression spring 70. In this state, the second pressed portion 64 is received on the second receiving portion 83c of the accommodation portion 83.

When the card 200 is inserted into the card housing space 32, the transmission portion 42 receives a force due to the insertion of the card 200 so that the slider 40 slides toward the first position. In this event, the projection portion 44 is also moved forward in the Y-direction and releases the edge 61d2. Because the second compression spring 70 always provides the first force to the first pressed portion 62, the released rocker arm 60 rotates around the pivot 11c so that the rocker arm 60 is positioned at the first rock position and the stopper portion 61d1 receives the rear end of the projection portion 44 in the Y-direction, as shown in FIGS. 18 to 20. The slider 40 is urged by the first compression spring 50 to slide toward the second position. Thus, after the complete insertion of the card 200, the slider 40 is prevented from sliding to the second position by the stopper portion 61d1.

The button 80 is pressed backwards in the Y-direction by the cantilever spring 22 so that the second pressed portion 64 is pressed against the first receiving portion 83d, as shown in FIG. 18.

As also shown in FIG. 18, the posterior edge receiving portion 63 is located behind the posterior end 210 of the card 200 so that the card 200 is prevented from undesirably falling out of the card socket 100. As apparent from the above description, card ejection is not carried out unless the button 80 is pressed inwards. For example, the rocker arm 60 does not rock toward the second position even if the card socket 100 receives some shock. Therefore, the malfunction of the card ejection mechanism does not occur according to the present embodiment. In addition, because the above-mentioned operations are carried out in accordance with the insertion of the card 200, there is no complex operation and the operationality is good. The pivot 11c and the pivot portion 61a are placed between the first and the second pressed portions 62 and 64 which receive the first force and the second force both for rocking the rocker arm 60, so that the high reliability and the high operationality described above can be obtained without making the projection area of the card socket 100 large.

Figure 21:
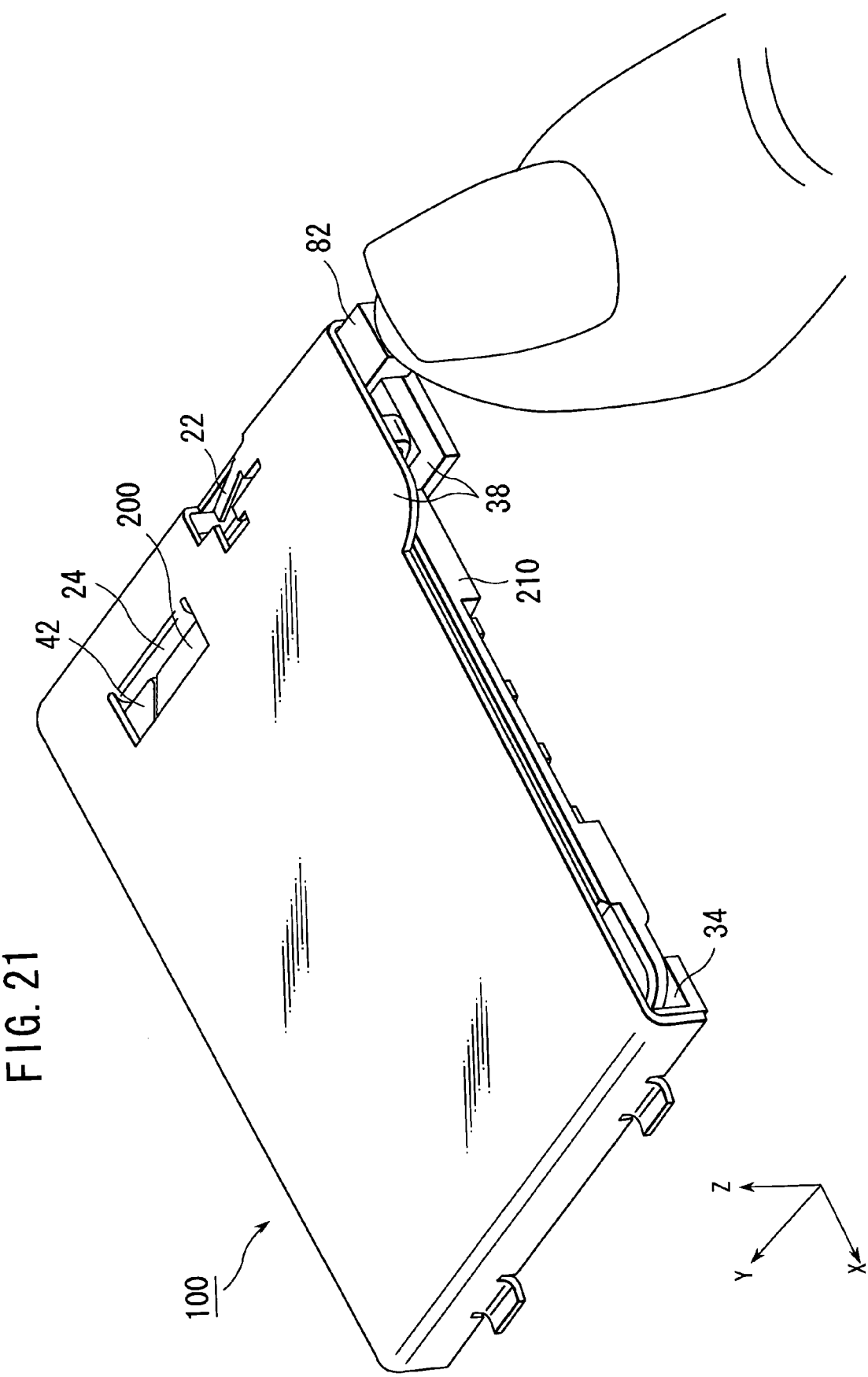
FIG. 21 is a view which shows relation of a pressed portion of the button and the overhanging portion of the case.

As shown in FIG. 21, when the pressed portion 82 of the button 80 is pressed inward of the card socket 100 or forward in the Y-direction, the second pressed portion 64 receives the second force so that the rocker arm 60 is moved toward the second rock position. In this event, the stopper 61dl releases the projection portion 44 so that the slider 40 is moved toward the second position by the first compression spring 50. The movement of the slider 40 is transmitted to the card 200 through the transmission portion 42 so that the card 200 is ejected from the card socket 100. As apparent from FIG. 21, because the case 30 according to this embodiment comprises the overhanging portion 38, the posterior end 210 of the card 200 does not directly pressed, even when the button 80 is pressed. Therefore, the card 200 is protected from erroneous insertion. Furthermore, when the button 80 is pressed to eject the card 200, the card 200 comes into contact with a finger of a user. Therefore, the problem of unexpected jump of the card 200 is avoidable.

Figure 23:
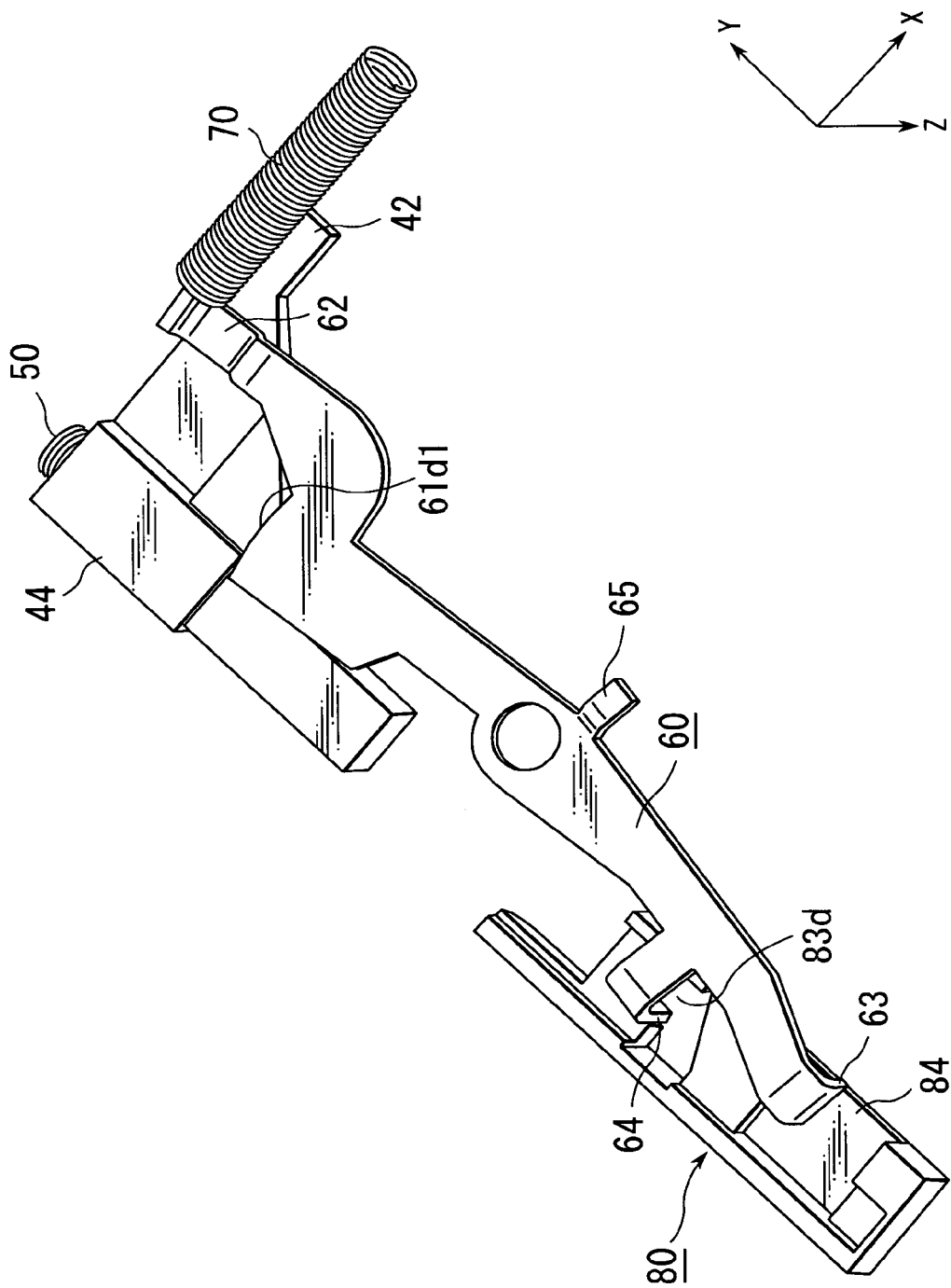
FIG. 23 is a bottom view of the card socket in the state shown in FIG. 22 and shows relation of main parts.

In this embodiment, the rocker arm 60 has a third rock position. The third rock position is a rock position between the first and the second rock positions. As shown in FIGS. 22 and 23, when the rocker arm 60 is positioned at the third rock position, the posterior edge receiving portion 63 is located within the space 84, while the stopper portion 61d1 receives the projection portion 44 in the Y-direction. The angle between the first plate portion 61d and the third plate portion 61f of the rocker arm 60 and the projection amount of the edge portion 61d2 or the lateral length of the stopper portion 61 dl are selected to allow the rocker arm 60 to take the third rock position.

Because the rocker arm 60 takes the third rock position, the card socket 100 can accept two types of cards whose lengths in the Y-direction are different from each other. When the small card 200 of the predetermined length is inserted as shown in FIGS. 18 and 19, the slider 40 is positioned at the first position, and the rocker arm 60 is positioned at the first rock position. On the other hand, when the long card longer than the predetermined length is inserted, the slider 40 is also pressed toward the first rock position, and the rocker arm 60 is rotated by the first force of the second compression spring 70, as shown in FIGS. 22 and 23. However, the posterior edge receiving portion 63 is brought into contact with the side portion of the long card so that the rotation of the rocker arm 60 is stopped. Thus, the rocker arm 60 does not reach the first rock position and stays at the third position.

When the long card is inserted, the second pressed portion 64 leaves the second receiving portion 83c and moves toward the first receiving portion 83b as well as the insertion of the small card. However, the movement of the second pressed portion 64 is stopped before the second pressed portion reaching to the first receiving portion 83b. In this embodiment, the pocket portion 83d is formed in the accommodation portion 83, so that the stopped second pressed portion 64 is received on a third receiving portion 83e of the pocket portion 83d. The button 80 can projects outwardly from the case 30.

In this embodiment, the cantilever spring 22 of the caver 20 is an example of the urging portion which urges the button 80 to move toward in the card ejection direction. This urging portion is not limited to the cantilever spring 22, but may be another structure which can urge the button 80 to move toward the card ejection direction.

Although particular embodiments of the invention have been described and illustrated herein, it is recognized that modifications and variations may readily occur to those skilled in the art, and consequently, it is intended that the claims be interpreted to cover such modifications and equivalents.

We claim:

1. A card socket comprising:
a case which holds a card and allows insertion/ejection of the card thereinto/therefrom;
a slider which is slidably held in the case and is provided with a transmission portion for mutually transmitting movements of the card and the slider therebetween, wherein the slider is slidable between a first position and a second position, and the slider slides with the card toward the first position upon the insertion, while the slider slides with the card toward the second position upon the ejection;
first urging means which urges the slider to move toward the second position;
a rocker arm which is provided with a fulcrum, first and second pressed portions and a stopper, wherein the fulcrum is held in the case in a condition where the rocker arm is rockable between a first rock position and a second rock position, wherein the rocker arm is positioned at the first rock position when the slider is positioned at the first position, wherein the rocker arm is positioned at the second rock position when the slider is positioned at the second position, wherein the fulcrum is positioned between the first and the second pressed portions, wherein the stopper is located between the first pressed portion and the fulcrum, and wherein the stopper receives the slider positioned at the first position when the rocker arm is positioned at the first rock position;
second urging means which provides a first force for the first pressed portion to urge the rocker arm to move toward the first rock position; and
an operation member which is movably held by the case and is for providing a second force for the second pressed portion to urge the rocker arm to move toward the second rock position against the first force.

2. A card socket according to claim 1, wherein:
the case is provided with a card housing space and an open end, wherein the open end allows the card to be inserted into the card housing space and allows the card to be ejected from the card housing space along a first direction;
the open end has a rectangle shape, which is long in a second direction orthogonal to the first direction and is short in a third direction orthogonal to the first and the second directions;
the slider is slidable along the first direction; and
the second urging means is placed farther from the open end than the card housing space and provides the first force along the second direction.

3. A card socket according to claim 2, wherein:
the rocker arm comprises a main plate, the first pressed portion and the second pressed portion;
the main plate is provided with first and second end portions and the fulcrum;
the fulcrum is positioned between the first and the second end portions;
the first pressed portion is positioned at the first end portion;
the second pressed portion is positioned between the fulcrum and the second end portion; and
the main plate is laid on a plane defined by the first and the second directions.

4. A card socket according to claim 3, wherein:
the second urging means comprises a compression spring;
the case comprises a guide rail and a wall, wherein the guide rail extends in the second direction at a specific region which is farther from the open end in the first direction than the card housing space, and the wall extends in the second and the third directions and is located far from the guide rail by a predetermined distance;
the guide rail and the wall of the case define a spring accommodation portion which accommodates the compression spring of the second urging means; and
the first pressed portion is provided with a U-shaped portion, which projects from the first end portion in the third direction and is arranged to straddle the guide rail to be brought into contact with the compression spring of the second urging means in the second direction.

5. A card socket according to claim 4, wherein:
the main plate of the rocker arm comprises a first plate portion, a second plate portion and a third plate portion;

the first plate portion extends from the fulcrum toward the wall and is provided with a narrow plate portion and a wide plate portion;

the narrow plate portion is connected between the fulcrum and the wide plate portion;

the wide plate portion projects toward the second position of the slider;

the second plate portion has an L-shaped portion, which extends from the wide plate portion of the first plate portion away from the slider and then extends toward the wall;

the first pressed portion is formed at a free end of the second plate portion;

the third plate portion is connected to the first plate portion; and the fulcrum is positioned between the first and the third plate portions.

6. A card socket according to claim 5, wherein:

the slider comprises a projection portion, which projects in the third direction;

the wide plate portion receives the projection portion in the first direction when the rocker arm is positioned at the first rock position, wherein the wide plate portion serves as the stopper; and the projection portion is brought into contact with the wide plate portion in the second direction to prevent the rocker arm from moving toward the first rock position when the rocker arm is positioned at the second rock position.

7. A card socket according to claim 2, wherein:

the second pressed portion of the rocker arm projects in the third direction;

the operation member is held by the case and is movable in the first direction;

the operation member is provided with an accommodation opening which accommodates the second pressed portion; and the accommodation opening is provided with a cam surface which translates motion of the operation member into the second force.

8. A card socket according to claim 7, wherein:

the operation member is a button which outwardly projects from the case in the first direction in a state of the insertion and which is movable inwardly of the case by being pushed along the first direction; and the cam surface translates the inward movement of the operation member.

9. A card socket according to claim 8, wherein:

the case comprises a overhanging portion which sticks out from the open end in the first direction; and the operation member projects from the overhanging portion in the first direction in the state of the insertion.

10. A card socket according to claim 7, wherein:

the slider is further provided with a main portion;

the main portion extends in the first direction;

the transmission portion extends from the main portion in the second direction; and the main portion of the slider and the operation member are arranged on an imaginary straight line which extends along the first direction.

11. A card socket according to claim 10, wherein:

the main portion and the operation member are arranged outside the card housing space in the second direction.

12. A card socket according to claim 10, wherein:

the fulcrum of the rocker arm is away from the imaginary straight line in the second direction.

13. A card socket according to claim 2, wherein:

the rocker arm is provided with a posterior edge receiving portion;

the posterior edge receiving portion is for receiving a posterior edge of a particular card which has a predetermined size and is completely insertable in the card holding space; and the posterior edge receiving portion is positioned between the open end and the second pressed portion and projects toward the third direction.

14. A card socket according to claim 13, wherein:

the rocker arm is positionable at a third rock position between the first and the second rock positions when a long card is inserted, which is longer in the first direction than the particular card;

the stopper holds the slider in the first position even when the rocker arm is positioned at the third rock position; and the posterior edge receiving portion is located outside the card housing space in the first direction, when the rocker arm is positioned at the third rock position.

* * * * *